United States Patent [19]

Childress et al.

[11] Patent Number: 4,992,490

[45] Date of Patent: Feb. 12, 1991

[54] BASE COAT AND PRIMER FILM-FORMING COMPOSITIONS CONTAINING POLYACRYLATE FIBERS, ACRYLIC POLYMER PRECURSORS, STYRENE AND POLYESTER RESIN PARTICULARLY ADAPTED FOR AUTOMOBILE FINISHING APPLICATIONS

[75] Inventors: David L. Childress, Memphis, Tenn.; Mark A. Garner, Sr., Walls, Miss.; William L. Childress, Memphis, Tenn.; John Power, Canajoharie, N.Y.

[73] Assignee: Miracle Shield Partnership, Memphis, Tenn.

[21] Appl. No.: 176,262

[22] Filed: Mar. 31, 1988

[51] Int. Cl.$^5$ .......................... C08K 5/01; C08K 5/02; C08K 5/04; C08L 67/06
[52] U.S. Cl. .................................. 523/511; 523/518; 523/526; 525/170
[58] Field of Search ................ 525/168, 170; 524/513; 523/526, 518, 523, 511

[56] References Cited

U.S. PATENT DOCUMENTS

| | | | |
|---|---|---|---|
| 3,703,406 | 11/1972 | Sakurada et al. | 525/10 |
| 4,245,059 | 1/1981 | Ichimura et al. | 525/168 |
| 4,755,557 | 7/1988 | Atkins et al. | 525/168 |
| 4,777,196 | 10/1988 | Hefner, Jr. | 523/526 |

*Primary Examiner*—Allan M. Lieberman
*Attorney, Agent, or Firm*—Peter J. Georges

[57] ABSTRACT

A coating composition is described that is comprised of (1) polyacrylate fibers, (2) at least one monomer which forms an acrylic polymer, (3) styrene monomer, (4) unsaturated polyester resin, (5) a polymerization inhibitor (to prevent premature polymerization prior to application), and (6) an inert carrier in which each acrylic polymer-forming monomer and the styrene monomer are soluble. The inert carrier described and the miscible/soluble components form a medium wherein polyacrylate fiber suspension is easily achieved and maintained. The coating composition can be used as a base coat or primer without need for finishing prior to application of an overcoat of paint.

32 Claims, No Drawings

BASE COAT AND PRIMER FILM-FORMING COMPOSITIONS CONTAINING POLYACRYLATE FIBERS, ACRYLIC POLYMER PRECURSORS, STYRENE AND POLYESTER RESIN PARTICULARLY ADAPTED FOR AUTOMOBILE FINISHING APPLICATIONS

BACKGROUND OF THE INVENTION

1. Field of the Invention

The present invention relates to film-forming coating compositions that are useful as base coats or primers in auto body finishing and as paint diluents and corrosion inhibiting film-forming compositions.

2. Description of the Prior Art

The prior art coating compositions used as base coats and primers for automobile finishing generally are formulations which are proprietary in nature and require sanding prior to application of paint thereover in order to achieve an acceptable paint finish.

It has been found that the coating compositions of the present invention dry quickly and can be used as a base coat or primer without need for any further finishing after they are applied and prior to application of paint. In fact, the surface finish of the coating compositions of the present invention is such that the coating composition can be combined with paint and used as a diluent for car paint formulations.

SUMMARY OF THE INVENTION

The present invention relates to a coating composition comprised of (1) polyacrylate fibers, (2) at least one monomer which forms an acrylic polymer, (3) styrene monomer, (4) unsaturated polyester resin, (5) a polymerization inhibitor (to prevent premature polymerization prior to application), and (6) an inert carrier in which each acrylic polymer-forming monomer and the styrene monomer are soluble. Generally the inert carrier described and the miscible/soluble components form a medium wherein polyacrylate fiber suspension is easily achieved and maintained. It has been found that a homogeneous mixture can be maintained over the required range of additional carrier and/or diluent that is necessary for the various applications for which the coating composition may be used.

The polyacrylate fiber is preferably selected from the group consisting of poly(alkyl acrylates), poly(aralkyl acrylates) and admixtures thereof. Suitably the polyacrylate fiber may be a poly(alkyl acrylate) wherein the alkyl substituent is $C_1$ to $C_8$. One of the most preferred poly(alkyl acrylate) fibers is poly(methyl acrylate).

The polyacrylate fiber is present in an amount of from about 1 wt. % to about 20 wt. % based on total content by weight of polyacrylate fibers, at least one monomer which forms acrylic polymer, styrene monomer and unsaturated polyester resin.

The polyacrylate fibers suitably fall within a range of from about 10,000 Mw to about 1,200,000 Mw. (Mw being defined as weight average molecular weight.) Preferably the polyacrylate fiber component has a Mw of from about 20,000 Mw to about 150,000 Mw.

The monomers which form the acrylic polymer include acrylonitrile, methacrylonitrile, and other alkacrylonitrile monomers; acrylic acid, methacrylic acid, and other alkacrylic acid monomers; methyl acrylate, ethyl acrylate, and other alkyl acrylate monomers; methyl methacrylate, ethyl methacrylate, and other alkyl alkacrylate monomers; and acrylamide, methacrylamide, and other alkacrylamide monomers. Combinations of monomers which form an acrylic polymer may be used and such combinations of monomers can include acrylonitrile and/or methacrylonitrile monomers.

Admixtures comprising (1) acrylonitrile and/or methacrylonitrile monomer and (2) a monomer selected from the group consisting of methacrylic acid, acrylamide and mixtures thereof are preferred.

The content of monomer which forms an acrylic polymer in the coating composition is preferably from about 1 wt. % to about 20 wt. % based on total content by weight of polyacrylate fibers, monomer which forms acrylic polymer, styrene monomer and unsaturated polyester resin.

In forming the coating composition, unsaturated polyester resin is suitably added as a mixture of unsaturated polyesters in styrene monomer formulations. The styrene monomer content can originate in whole or in part from such formulations and is preferably from about 10 wt. % to about 60 wt. % based on total content by weight of polyacrylate fibers, monomer which forms acrylic polymer, styrene monomer and unsaturated polyester resin.

Without wishing to be bound, it is believed that the acrylate monomers involved in the polymerization reaction such as acrylamide, methacrylic acid, and methylacryonitrile provide a range of hydrophobicities which allow a range of interactions for varying surface chemistries. A second type of polymerization reaction which is believed to occur is the formation of polystyrene from the styrene monomer. This produces a very hydrophobic polymer, with little tendency to interact with polar surfaces. The third component of the polymerization mixture is the unsaturated polyester resin. The unsaturated carbon-carbon bonds in this resin provide a suitable point of attack for free radicals generated in the two preceding polymerization reactions, thus generating a highly branched three-dimensional molecule. It is believed that a three-dimensional terpolymer is formed, probably random in form. Although styrenes, acrylates, and methacrylates can undergo various types of polymerization reactions, only free radical mechanisms generated by thermal energy are believed required for film formation. The free radicals generated during polymerization are also capable of reacting directly with a wide variety of surfaces, further strengthening bonding with substrate or overcoat.

As the three-dimensional polymer cures it contracts, this traps the polyacrylate fibers within the three-dimensional matrix. This architecture is much less elastic and much harder than the three-dimensional polymer without polyacrylate fibers. The inclusion of these fibers within the matrix provides the film that is formed with strength and resiliency.

In summary, after polymerization, the monomers used in the reaction provide an extended range of hydrophobicities (styrene > methylacrylonitrile > methacrylic acid > acrylamide) and resultant bonding to many types of surfaces. The inclusion of unsaturated polyester fibers provides a site for cross-linking of linear monomeric polymers into a large elastic film. This structure is hardened and strengthened by the inclusion of polyacrylate fibers which are held within the polymer matrix during curing.

DETAILED DESCRIPTION OF THE INVENTION

The ratio by weight of the components of the coating composition may vary substantially depending on the particular application. Based on total content by weight of polyacrylate fibers, acrylic polymer-forming monomer, unsaturated polyester resin and styrene weight, the percentages by weight selected for the film-forming ingredients may suitably be: (1) for polyacrylate fibers, about 0.5 to about 20.0 wt. %, (2) for acrylic polymer-forming monomer, about 0.5 to about 20.0 wt. %, (3) for styrene monomer, about 10 to about 60 wt. % and (4) for unsaturated polyester resin, about 20 to about 80 wt. %. Particular formulations of content outside the foregoing ranges may also be used though not necessarily with equivalent results. Preferred percentages, by weight, based on total content of polyacrylate fibers, acrylic polymer-forming monomer, unsaturated polyester resin and styrene are as follows: (1) polyacrylate fibers from about 1 wt. % to about 10 wt. %, (2) acrylic polymer-forming monomers from about 1 wt. % to about 15 wt. %, (3) styrene monomer from about 20 wt. % to about 60 wt. % and (4) unsaturated polyester resin from about 30 wt. % to about 70 wt. %. Suitable formulations in this latter range may comprise (1) polyacrylate fibers of from about 1 wt. % to about 5 wt. %, (2) acrylic polymer-forming monomers of from about 1 wt. % to about 5 wt. %, (3) styrene monomer of from about 30 to about 60 wt. % and (4) unsaturated polyester resin from about 40 wt. % to about 60 wt. %.

The carrier is preferably present in an amount of from about 20% to about 90% v/v, with optimal content generally in the range of from about 40% v/v to about 80% v/v.

The carrier can be any inert ketone such as the dialkyl ketones, of which acetone and methyl ethyl ketone are preferred. Also suitable are aromatic solvents such as xylene and toluene; and alkyl halides such as methylene chloride. Other solvents that may be used include alcohols and diols such as isopropanol and ethylene glycol; alkyl esters, such as cellosolve, isoamyl acetate, butyl acetate; petroleum ethers (alkanes), for example hexanes and heptanes.

The final composition and concentration of carrier is based on the specific formulation and viscosity desired. The carrier's relative viscosity should be less than 1, where water is defined as having a viscosity of 1; preferably the viscosity should be about 0.8 or less.

Inhibitors suitable for the present coating composition are readily appreciated by one skilled in the art. Appropriate free radical scavengers typically used in monomer formulations are satisfactory. Such inhibitors include 4 tert butylcatechol, which is present in styrene commercially available from Aldrich Chemical Co. of Milwaukee, Wis. and is generally present in an amount of from about 10–15 ppm.

Inhibitors such as hydroquinone monomethyl ether which are typically used in commercially available acrylonitriles are also suitable for use in the coating compositions of the present invention. In the acrylonitrile distributed by Aldrich Chemical Co. such hydroquinone ethers are present in amounts of from about 35–45 ppm.

Likewise, hydroquinone may be used as an inhibitor and is suitably introduced in admixture with commercially available methacrylic acid. In methacrylic acid distributed by Aldrich Chemical Co., hydroquinone is present in amounts of 1,000 ppm along with hydroquinone monomethyl ether in amounts of about 250 ppm.

It has been found that the required content of polymerization inhibitors found in the commercially available components incorporated into the coating composition of the present inhibitor provide adequate inhibition of polymerization for the composite mixture of all components that comprise the coating composition of the present invention.

One coating formulation of the present invention comprised of (1) 33% by volume DURACRYL CLEAR (DCA 468), a PPG Industries, Inc. proprietary formulation comprised of 5% oxo-heptyl acetate, 45% toluene, 15% methyl ethyl ketone and 35% film formers comprised of acrylic monomers and polyacrylate fibers, (2) 33% by volume POLYLITE ™ from Reichold Chemicals, Inc., comprised of about 50% unsaturated polyester resin and 50% styrene monomer and (3) 33% by volume PPG thinner DTL 10 containing by volume

| Acetone | 20%, |
| Xylene | 45%, |
| Ethylene Glycol | 5%, |
| Petroleum Ether | 15%, |
| Isopropanol | 15%, | was stored in quart size metal paint cans with metal tops. The coating material was stored for about 10 months at temperatures within the range of from about −15° C. to 35° C. The cans were opened and closed about 30 times. The coating composition was stable over that time and no film was formed on the exposed surface of the coating composition in the paint cans.

Another coating formulation of the present invention comprised of 1.0 (w/v)%, poly(methyl methacrylate) resin, 16.3 (w/v)% unsaturated polyester resin, 16.3 (v/v)% styrene, 0.5 (v/v)% methyl acrylonitrile, 0.5 (v/v)% methacrylic acid, 0.5 (w/v)% acrylamide in a carrier comprised of 28 (v/v)% methylene chloride, 12 (v/v)% acetone, 5 (v/v)% cellosolve, 15 (v/v)% hexane and 15 (v/v)% isopropanol was stored in clear glass containers and metal paint cans for about eight months at temperatures within the range of from about 11° C. to about 35° C. Despite numerous openings of the containers, the coating composition was stable over the 8 month period and no film was formed on the exposed surface of the coating composition in the containers.

Tests were run in which polyacrylate fibers of various composition and size were utilized as alternative components of the composition of the present invention.

The polyacrylate fibers utilized were those available from Aldrich Chemical Company, Milwaukee, Wis. 53233 in Polymer Kit 18,338-5 described as follows:

| poly(methyl acrylate) | 30,700 Mw | 10,600 Mn |
| poly(ethyl acrylate) | 71,600 Mw | 29,200 Mn |
| poly(butyl acrylate) | 61,800 Mw | 20,700 Mn |
| poly(2-ethylhexyl acrylate) | 23,300 Mw | 13,000 Mn |

Mw = average molecular weight.
Mn = number average molecular weight (size distribution).

Each of the above-identified fibers are suitable for use in the present invention. Typically the fibers are in suspension. With the above exemplified fibers toluene was used as the suspending medium. Methylene chloride, xylene and other aromatic and/or halogenated alkane solvents, among others, are also suitable as suspending mediums.

The polyacrylate fiber is suitably selected from the group consisting of poly(alkyl acrylates) and poly(aralkyl acrylates).

The polyacrylate fiber component preferably is (1) a $C_1$-$C_8$ alkyl acrylate inclusive of straight, branched chain poly(alkyl acrylates) and poly(cycloalkyl acrylates) or (2) poly(aralkyl acrylates), e.g., poly(benzyl methylacrylate).

The size of the polyacrylate fiber is such that a homogeneous suspension in the suspending solvent is achieved. The fiber's size may vary over a broad range. Fibers of from about 10,000 to 1,200,000 or more weight average molecular weight may be utilized.

For high fiber content formulations methylene chloride is a suspending medium of choice.

The monomers of the present coating composition that form acrylic polymers may include (1) acrylonitrile and methacrylonitrile or other lower alkylacrylonitriles, although the latter will not necessarily provide equivalent results; (2) acrylic acid, methacrylic acid and other lower alkyl acrylic acids and/or esters; and (3) acrylamide, lower alkyl acrylamides such as methylacrylmide and/or bis acrylamide.

In accordance with the present invention, the acrylic polymer forming monomer is preferably selected from the group consisting of acrylamide, methacrylamide, acrylic acid, methacrylic acid, ethacrylic acid, acrylonitrile and methacrylonitrile or mixtures thereof.

One of the preferred monomer formulations in the coating composition comprises a mixture of acrylic polymer-forming monomers as follows:
methacrylonitrile
methacrylic acid
acrylamide.

In the above-described mixture, the preferred ratio of components is as follows:
methacrylonitrile: methacrylic acid from about 5:1 to about 1:5
methacrylic acid: acrylamide from about 5:1 to about 1:5

In the most preferred mixture, the ratio of methacrylonitrile to the other monomers (methacrylic acid and/or acrylamide) is about 3:1.

It has been discovered that where acrylonitrile monomer is used exclusively a very hard finish is obtained; however, the surface is discontinuous (crackly). Where methacrylic acid and/or acrylamide are used as monomer(s), a smooth finish is achieved, but the finish is soft. The admixture of monomers in the ratios indicated provides a continuous and hard finish.

The following table indicates test results obtained in the development of the admixtures of acrylic polymer forming monomers which provide contiguous finishes of required hardness.

The softening temperature is affected by (single) acrylate monomer concentration in coating compositions containing 1.0 (w/v) % poly(methyl methacrylate) fiber, 16.0 (w/v) % unsaturated polyester resin, 16.0 (v/v) % styrene and carrier 45 (v/v) % methylene chloride, 20 (v/v) % acetone, 5 (v/v) % ethylene glycol, 15 (v/v) % petroleum ether and 15 (v/v) % isopropanol.

The softening temperature (TS) of the coating composition decreases with increasing concentrations (0.020 to 1.0 Molar) of methacrylate and acrylamide monomers, while remaining relatively constant over the same concentration range of methacrylonitrile, as shown in Table I, in which the concentration on a solids or solvent-free weight basis is given in parentheses for each of the three monomers, corresponding to the solution concentration in moles for all of the monomers in the left column.

TABLE I

| Monomer Concentration, Molar | Methacrylonitrile | | Methacrylic Acid | | Acrylamide | |
|---|---|---|---|---|---|---|
| | Solids, Wt. % | TS, °C. | Solids, Wt. % | TS, °C. | Solids, Wt. % | TS, °C. |
| 0.020 | — | ND | — | ND | (0.142) | 59 |
| 0.060 | (0.40) | 98 | (0.60) | 64 | (0.430) | 51 |
| 0.200 | (1.30) | 88 | (1.80) | 55 | (1.400) | 37 |
| 0.390 | (2.70) | 92 | (3.90) | 42 | (2.800) | 36 |
| 0.980 | (6.70) | 98 | (11.7) | 37 | — | ND- |

The "softening temperature" for the resins was determined in the following manner. Fifty ul samples were applied to a microscope cover slip and cured for 2 hours at 50° C. The samples (total weight 0.140 gm) were placed on a monitored micro heating stage. The temperature was slowly raised from room temperature to 120° C. (increased at about 8° C./min.). A capillary tube (1 mm diameter) was dropped from a height of one inch onto the sample. The temperature at which the sample and cover slip could be lifted from the stage to a height of one inch was defined as the softening temperature.

Softening Temperature (TS) for polyacrylate-forming binary monomer mixtures in coating compositions containing 1.0 (w/v) % poly(methyl methacrylate) fiber, 16.0 (w/v) % unsaturated polyester resin, 16.0 (v/v) % styrene in carrier 45 (v/v) % methylene chloride, 20 (v/v) % acetone, 5 (v/v) % ethylene glycol, 15 (v/v) % petroleum ether and 15 (v/v) % isopropanol were measured. The binary mixtures which were used had a constant content of methacrylonitrile or methacrylate and variable contents of other monomers.

Softening temperatures of admixtures comprising methacrylonitrile and methacrylate and/or acrylamide were substantially higher than those comprising methacrylate and/or acrylamide without methacrylonitrile present.

Examples of unsaturated polyester resins that may be used in the present invention include those present in BONDTITE WHITE DIAMOND BODY FILLER, distributed by Oatey Co., Cleveland, Ohio, unsaturated polyester resin CAS Number 25464-21-S; POLYLITE ®, Reichold Chemicals, White Plains, N.Y., comprised of an unsaturated polyester resin, phthalic acid-polypropylene-maleic fumaric anhydride, bearing the shipping name Resin-solution-UN 1866 in styrene monomer; and, other commercially available unsaturated polyesters in monomers such as the trade named product UNSATURATED POLYESTER IN MONOMER, distributed by the company SILMAR, a division of SOHIO ENGINEERED MATERIALS COMPANY, Hawthorne, Calif. 90250, MSDS Number AP4.

The specific polyesters that may be used in the present invention may be selected from those typically used in batch mixtures of paint coats and other fillers, primers/base coat compositions, particularly the unsaturated polyesters provided in styrene monomer and identified above, such as (1) POLYLITE ®, (2) BONDTITE ®, SILMAR brand UNSATURATED POLYESTER IN MONOMER and also (4) PROFESSIONAL FIBERGLASS ™, an unsaturated polyester resin in styrene formulation distributed by Evercoat Co. of Cincinnati, Ohio.

Included among the unsaturated polyester resins useful in the coating composition are styrene soluble polycondensation products between radically polymeric dibasic acids such as maleic and fumaric acid and/or non-radically polymeric dibasic acids such as phthalic acid and glycols with polymeric monomers.

The percent of unsaturated polyester resin to styrene monomer may vary substantially without adversely effecting the coating composition. Typically, in commercially available formulations, the ratio by weight of unsaturated polyester resin to monomer is from about 3:1 to about 1:1; ratios of about 5:1 to about 1:5 are preferably maintained.

The coating composition is made by adding the components in any sequence to the inert volatile carrier, with mechanical agitation to achieve a homogeneous mixture in which the acrylic polymer forming monomer(s) is in solution and the styrene monomer and carrier form a solute/suspending medium for the polyester resin and polyacrylate fibers.

The preferred procedure involves first incrementally adding the polyacrylate fibers, which are commercially available in granulated form, to the carrier with mechanical stirring until a clear viscous mixture is achieved. Next, the acrylic polymer-forming monomer(s) are added. In the case where said monomers comprise methacrylonitrile, methacrylic acid and acrylamide, the acrylamide is added first (in powdered form) with stirring until dissolved, then methacrylic acid and methacrylonitrile (100%) are added (in liquid form) with stirring and dissolved in the carrier. The unsaturated polyester resin in styrene monomer is then added with stirring until the final mixture is opaque and very viscous. The ratio of carrier to added components is normally about 2:1 or more by volume. Normally at least a 2:1 ratio of carrier to added components is desirable in order to facilitate mixing and provide a stable coating composition. The coating composition can be readily thinned by adding additional carrier material, which may be the same or different from the carrier originally used to form the coating composition.

The carrier must be inert; that is, it must not react with the added monomers (either styrene monomer or the acrylic polymer-forming monomers) or the unsaturated polyester resin. The carrier must also be volatile. Any organic liquid in which the added monomers are soluble and stable and which has a vapor pressure less than water can be used. Since film formation, after application of the coating material, is inhibited by the presence of carrier, commercial carriers of higher volatility, suitably those containing low molecular weight ketones, alcohols and/or esters are preferred.

The coating material is particularly adapted for use as a base coat/primer for automobile finishes. The coating material of the present invention fills, seals and primes when applied with a spray gun (typically in this application multiple coats are required). Where multiple applications of the coating by spray gun are required, e.g., up to 4 coats may be required for rubber joints and where the coating is used as sealer/primer, then at least two minutes should elapse before applying a second coat. Use of the coating material of the present invention eliminates the need of glazing putty and primer/surfacer applications. The coating composition of the present invention provides an effective barrier between body filler and paint, blocking out bleed-through or staining that can occur with color coat/clear coat painting systems. The coating composition of the present invention prevents bleed-through on rubber bumpers. It can also be applied over properly cleaned and sanded steel, aluminum, fiberglass, rubber, glass, wood and previously painted surfaces. The coating material of the present invention provides a tough, non-shrinking layer. It can be built-up to the required depth by multiple applications, filling in sanding scratches, pinholes, crazed surfaces and other surface imperfections found in body filler, metal or fiberglass finishing. The surface, upon drying, is tack-free and may be painted without the need for sanding.

The coating composition can be used to replace bonding agents of the art such as Tiecoat ®, a bonding agent sold by PPG for application to metal and fiberglass surfaces and Sikkens BACFIS ®, a bonding agent for metal and fiberglass. Also, flex agents which are applied to polymer (rubber) surfaces typically used on automobiles on resilient components such as bumpers and flexible joints as well as vinyl roofs, such as CLASSIC 7108 ™ distributed by TREMCO Co. of Cleveland, Ohio, may be replaced with the coating composition of the present invention. The coating composition of the present invention can also be used in place of DELSEAL ™, which is an acryl sealer primer made by PPG, Pittsburgh, Pa.

The coating of the present invention is capable of forming a continuous coating which bonds to metallic, fiberglass, polymeric and glass surfaces on automobile exteriors.

The coating material adheres to and provides a smooth continuous film that covers abutting metallic and non-metallic automobile surfaces.

The coating may be applied using a spray gun by adjusting viscosity to specifications for the particular spray gun and finish required.

Typically the coating material is prepared and stored in a highly viscous form of high film-forming component content. Accordingly, it is generally necessary to dilute the coating composition for applications where the coating is to serve as a base coat for enamel or lacquer. Viscosity lowering solvents/diluents which are miscible with the coating composition and inert are well known to those skilled in the art and this feature is not a part of the present invention.

The coating material can be used as undercoating on vehicles and as a protective coating on articles, particularly metallic articles that are corrosion susceptible.

The coating material can be used at appropriate viscosity as a pigment base. Paint formulations of appropriate viscosity have been used with great success, providing a smooth finish comparable to commercially available automobile paint finishes.

EXAMPLE

The coating composition identified below was used as a bonding agent (paint substrate) on an automobile body sanded but not primed.

The coating composition was prepared by mixing:
1. 2 quarts of PROFESSIONAL FIBERGLASS ™, an unsaturated polyester resin in styrene formulation, distributed by Evercoat Co. of Cincinnati, Ohio;
2. 1 gallon of DURACRYL ®, DCA 468, a film forming composition containing acrylic polymer-forming monomers and polyacrylate fibers, xylene, carboxy ester and phthalic acid solvents, distributed by PPG, Pittsburgh, Pa.; and 3. 1½ gallons of KRONA 50, lacquer thinner, a carrier containing petroleum distillates ketones, esters, toluene, alcohols and glycol ethers, distributed by Krona Co. of Pearland, Tex.

The resulting coating composition was used without further dilution.

The coating composition was applied to a series of automobile bodies using Develvis JGA and NBC paint sprayers and also BINKS No. 7 paint sprayers at 45–50 psi using a series of two ENERGY AIR TM compressors generating 175 psi pressure, made by ACME Inc.

The application was effected using horizontal motion. Where a second coat was visually noted, as required, a second application was made after an interval of 2–3 minutes. No running was observed.

The coating was allowed to dry at room temperature for 10 minutes.

The car was immediately thereafter painted using Ditzler Duracryl Acrylic Lacquers TM, manufactured by Ditzler, a PPG subsidiary, Troy, Mich.

The paint finish, achieved without sanding of the coating composition base coat (bonding agent), after 8 hours of drying, was dry to the hand and provided a smooth permanent finish, without orange peel/pitting.

Similar results have been achieved with other lacquer or enamel paints with which the coating composition of the present invention has been found to be universally compatible.

The coating composition identified above has also been used as a paint composition by incorporating pigment/color forming components therein and the resulting admixture has been applied directly onto unprimed, sanded auto bodies. The resultant paint coat was substantially equivalent in finish to the paint coat obtained where the coating composition was used as a base coat (bonding agent) and the paint applied thereover.

An example of a paint composition comprised of the coating composition with pigment/color forming components mixed therewith is the mixture resulting from admixture of the following components:

1. 2 quarts of PROFESSIONAL FIBERGLASS TM, an unsaturated polyester resin in styrene formulation, distributed by Evercoat Co. of Cincinnati, Ohio;
2. 1 gallon of PPG DURACRYL ®, ACRYLIC LACQUER, DITZLER FINISHES, DDL 3534 DARK BRIAR BROWN POLY 1983-1984 GM, Chevrolet, Buick, Oldsmobile, Pontiac, Cadillac, Paint Code #67, containing lead and other heavy metal color-forming components, acrylic polymer-forming monomers and polyacrylate fibers in solvent;
3. 1½ gallons of KRONA 50, lacquer thinner, a carrier containing petroleum distillates, ketones, esters, toluene, alcohols and glycol ethers, distributed by Krona Co. of Pearland, Tex.

The coating composition has been found suitable as a coating for fingernails and as a coating/bonding agent for artificial nails. The coating has also been successfully used on wood as a protective coating and its ability to form a continuous water impermeable coating on a wide variety of surfaces makes the coating composition desirable as a water repellant. Other uses include use for water-proofing and sealing concrete.

As is evident from the foregoing, various modifications can be made without departing from the spirit of the invention. It is not intended to limit the invention to the details heretofore recited, the invention being defined in the claims which follow.

We claim:

1. A coating composition that is useful as base coats, as a primer without need for any further finishing after application thereof and prior to application of paint, and, when combined with paint, as a diluent for car paint formulations, comprising:
   a. polyacrylate fibers having:
      (1) a size such that said fibers form a homogeneous suspension in a solvent selected from the group consisting of toluene, methylene chloride, and xylene, and
      (2) a weight average molecular weight within the range of from about 10,000 to about 1,200,000;
   b. at least one monomer which forms an acrylic polymer;
   c. styrene monomer;
   d. unsaturated polyester resin, the ratio by weight of said resin to said styrene monomer being from about 5:1 to about 1:5;
   e. a polymerization inhibitor; and
   f. a volatile carrier, which does not react with said acrylic polymer-forming monomer, said styrene monomer, or said unsaturated polyester resin, in which each said acrylic polymer-forming monomer and said styrene monomer are soluble and which has a relative viscosity of 0.8 or less and a vapor pressure less than water, said carrier being from about 20% to about 90% v/v,
   wherein, as weight percentages that are based on total content by weight of said acrylic polymer fibers, said polymer-forming monomer, said styrene, monomer, and said resin, the contents of said composition are within the range of about 0.5 to about 20 for said fibers, within the range of about 0.5 to about 20 for said polymer-forming monomer, within the range of about 10 to about 60 for said styrene monomer, and within the range of about 20 to about 80 for said resin.

2. The composition of claim 1, wherein the ratio by weight of said unsaturated polyester resin to said styrene monomer is from about 3:1 to about 1:1.

3. The composition of claim 1, wherein said carrier is selected from the group consisting of low molecular weight ketones, alcohols, and esters.

4. The composition of claim 1, wherein said carrier is selected from the group consisting of dialkyl ketones, aromatic solvents, alkyl halides, alcohols, diols, alkyl esters, and petroleum ethers.

5. The composition of claim 1, wherein said carrier is selected from the group consisting of methyl ethyl ketone, methylene chloride, toluene, xylene, acetone, cellosolve, ethylene glycol, petroleum ether, hexane, heptane, and isopropanol.

6. The composition of claim 1, wherein said carrier is from about 40% v/v to about 80% v/v.

7. The composition of claim 1, wherein said contents, as said weight percentages, are from about 1 to about 10 for said fibers, from about 1 to about 15 for said polymer-forming monomer, from about 20 to about 60 for said styrene monomer, and from about 30 to about 70 for said resin.

8. The composition of claim 1, wherein said contents, as said weight percentages, are from about 1 to about 5 for said fibers, from about 1 to about 5 for said acrylic polymer-forming monomer, from about 30 to about 60 for said styrene monomer, and from about 50 to about 60 for said resin.

9. The coating composition of claim 1 wherein the polyacrylate fiber is selected from the group consisting of poly(alkyl acrylates), poly(aralkyl acrylates) and admixtures thereof.

10. The coating composition of claim 9 wherein the polyacrylate fiber comprises a poly(alkyl acrylate) wherein the alkyl substituent is $C_1$ to $C_8$.

11. The coating composition of claim 10 wherein the poly(alkyl acrylate) is poly(methyl acrylate).

12. The coating composition of claim 11 wherein the poly(methyl acrylate) is present in an amount of from about 0.5 weight percent (wt. %) to about 20 wt. % based on total content by weight of acrylic polymer fibers, monomer which forms acrylic polymer, styrene monomer and polyester resin.

13. The coating composition of claim 10 wherein the fiber-forming polyacrylate fiber has a weight average molecular weight of from about 10,000 to about 1,200,000.

14. The coating composition of claim 11 wherein the fiber-forming polyacrylate fiber has a weight average molecular weight of from about 10,000 to about 1,200,000.

15. The coating composition of claim 12 wherein the fiber-forming polyacrylate fiber has a weight average molecular weight of from about 10,000 to about 1,200,000.

16. The coating composition of claim 10 wherein the fiber-forming polyacrylate fiber has a weight average molecular weight of from about 20,000 to about 150,000.

17. The coating composition of claim 11 wherein the fiber-forming polyacrylate fiber has a weight average molecular weight of from about 20,000 to about 150,000.

18. The coating composition of claim 12 wherein the fiber-forming polyacrylate fiber has a weight average molecular weight of from about 20,000 to about 150,000.

19. The coating composition of claim 11 wherein a combination of monomers which form said acrylic polymer are used and the combination of monomers includes acrylonitrile or methacrylonitrile monomer.

20. The coating composition of claim 10 wherein a combination of monomers which form said acrylic polymer are used and the combination of monomers includes acrylonitrile or methacrylonitrile monomer.

21. The coating composition of claim 11 wherein a combination of monomers which form said acrylic polymer are used and the combination of monomers includes acrylonitrile or methacrylonitrile monomer.

22. The coating composition of claim 12 wherein a combination of monomers which form said acrylic polymer are used and the combination of monomers includes acrylonitrile or methacrylonitrile monomer.

23. The coating composition of claim 13 wherein a combination of monomers which form said acrylic polymer are used and the combination of monomers includes acrylonitrile or methacrylonitrile monomer.

24. The coating composition of claim 14 wherein a combination of monomers which form said acrylic polymer are used and the combination of monomers includes acrylonitrile or methacrylonitrile monomer.

25. The coating composition of claim 15 wherein a combination of monomers which form said acrylic polymer are used and the combination of monomers includes acrylonitrile or methacrylonitrile monomer.

26. The coating composition of claim 1, wherein said at least one monomer is an admixture of monomers which form said acrylic polymer, said admixture comprising (1) acrylonitrile or methacrylonitrile monomer and (2) a monomer selected from the group consisting of methacrylic acid, acrylamide and mixtures thereof.

27. The coating composition of claim 10, wherein said at least one monomer is an admixture of monomers which form said acrylic polymer, said admixture comprising (1) acrylonitrile or methacrylonitrile monomer and (2) a monomer selected from the group consisting of methacrylic acid, acrylamide and mixtures thereof.

28. The coating composition of claim 11, wherein said at least one monomer is an admixture of monomers which form said acrylic polymer, said admixture comprising (1) acrylonitrile or methacrylonitrile monomer and (2) a monomer selected from the group consisting of methacrylic acid, acrylamide and mixtures thereof.

29. The coating composition of claim 12, wherein said at least one monomer is an admixture of monomers which form said acrylic polymer, said admixture comprising (1) acrylonitrile or methacrylonitrile monomer and (2) a monomer selected from the group consisting of methacrylic acid, acrylamide and mixtures thereof.

30. The coating composition of claim 13, wherein said at least one monomer is an admixture of monomers which form said acrylic polymer, said admixture comprising (1) acrylonitrile or methacrylonitrile monomer and (2) a monomer selected from the group consisting of methacrylic acid, acrylamide and mixtures thereof.

31. The coating composition of claim 4, wherein said at least one monomer is an admixture of monomers which form said acrylic polymer, said admixture comprising (1) acrylonitrile or methacrylonitrile monomer and (2) a monomer selected from the group consisting of methacrylic acid, acrylamide and mixtures thereof.

32. The coating composition of claim 15, wherein said at least one monomer is an admixture of monomers which form said acrylic polymer, said admixture comprising (1) acrylonitrile or methacrylonitrile monomer and (2) a monomer selected from the group consisting of methacrylic acid, acrylamide and mixtures thereof.

* * * * *